April 12, 1927.  1,624,713

T. A. BOYD ET AL

SPINDLE OF SPINNING, TWISTING, AND LIKE FRAMES

Filed July 9, 1926   2 Sheets-Sheet 1

INVENTOR.
Thomas Alexander Boyd
and Harold Arthur Boyd
by their attorneys
Howson and Howson

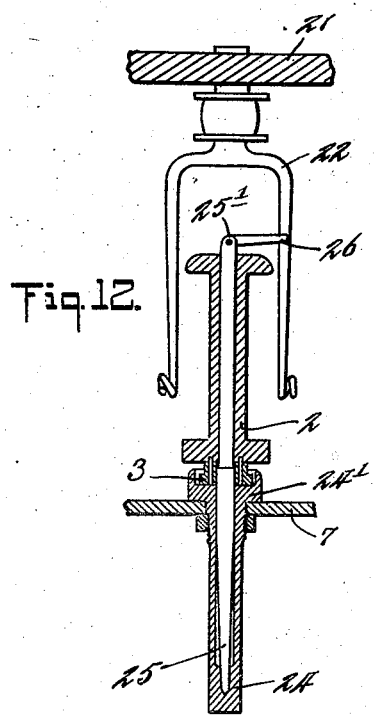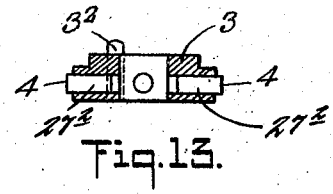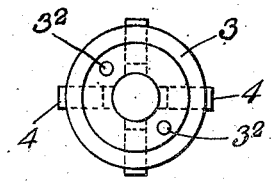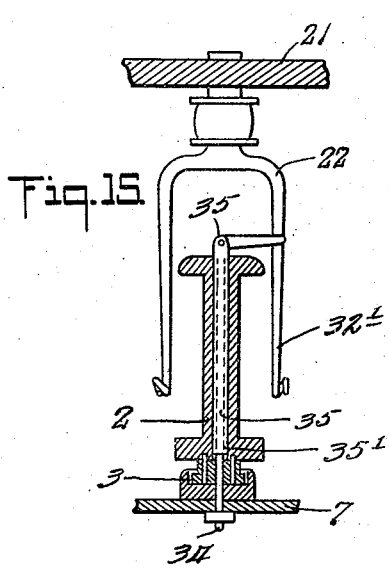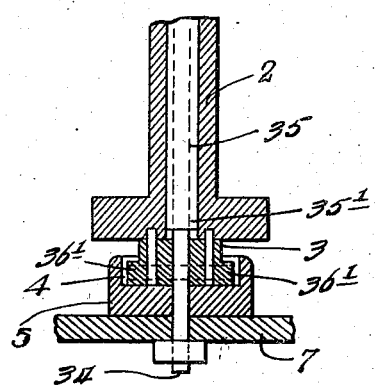

Patented Apr. 12, 1927.

1,624,713

UNITED STATES PATENT OFFICE.

THOMAS ALEXANDER BOYD AND HAROLD ARTHUR BOYD, OF GLASGOW, SCOTLAND.

SPINDLE OF SPINNING, TWISTING, AND LIKE FRAMES.

Application filed July 9, 1926, Serial No. 121,434, and in Great Britain November 4, 1925.

Our invention refers to flyer spinning, twisting and like frames and consists in improved construction and working of bobbin drag effected by centrifugal members. The use of centrifugal members for effecting bobbin drag on bobbins carried on dead spindles or on bobbins traversed up and down on ordinary spinning spindles is known in the trade. According to this invention centrifugal members used to drag bobbins on flyer spinning frames are carried around the spindle by means of discs or stars coaxial with the spindle the said discs or stars having around their periphery receptacles to receive the said centrifugal members those receptacles being open upwards so as to permit the insertion or removal of the centrifugal members as required. This invention also includes the application of centrifugal members to spindles or tubes carrying bobbins which spindles or tubes are driven at the same speed as the flyers. By this arrangement the cup or ring against which the centrifugal members impinge is kept perfectly coaxial with the spindle or tube.

In the drawings—

Fig. 12 shows how the invention may be adapted to a construction wherein a top flyer rail is employed;

Fig. 13 is a detailed vertical section showing the disc used in connection with the embodiment shown in Fig. 12;

Fig. 14 is a plan view of Fig. 13;

Fig. 15 illustrates in vertical section another form of the invention, wherein a top rail is employed;

Fig. 16 is a detail of Fig. 15.

Figure 1:
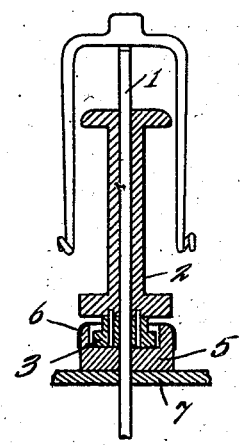
Fig. 1 is an elevation partly in section showing one form of the invention.
Figures 2, 4:
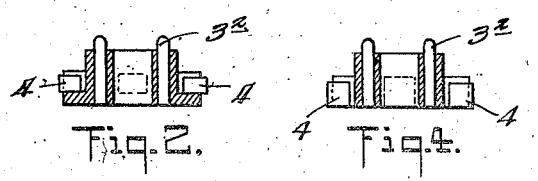
Fig. 2 is an enlarged vertical section of the disc shown in Fig. 1.
Fig. 4 is a vertical section of another form of disc.
Figure 3:
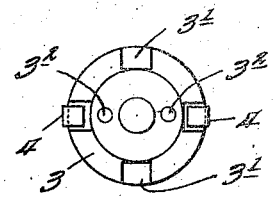
Fig. 3 is a plan view of Fig. 2.
Figure 5:
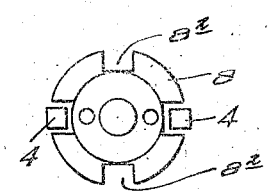
Fig. 5 is a plan view of Fig. 4.

In giving a first practical example of our invention as applied to a worsted spinning frame we mount (Figs. 1, 2, and 3,) on a flyer spindle 1 a bobbin 2—below it a disc 3 with open channels $3^1$ on the upper side of same. The said channels $3^1$ radiate to the periphery of the disc. In the channels $3^1$ we lay round pins 4 preferably of wood, one or more. A cup 5 is placed coaxially with the spindle 1 below the disc 3 with its sides embracing but clear of same. Against the inside of this cup 5 the round pins press by centrifugal force. The disc 3 has pins $3^2$ upstanding which enter a slot in the bobbin and by means of which it is driven. On the cup 5 we mount a cap cover 6 fitting tightly on the outside of the cup 5 and covering the top of same but with a hole to allow the disc 3 to project upwards and support the bobbin 2. Below the cup 5 we mount a lifting rail 7 which traverses the bobbin 2 up and down. In some cases we make the disc with the channels $8^2$ (Figs. 4 and 5) for the centrifugal members 4 cut right through the disc 8.

Figure 6:
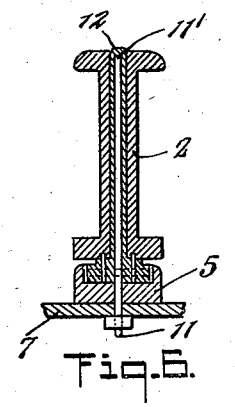
Fig. 6 is a vertical section of the invention wherein a dead spindle is used.
Figure 7:
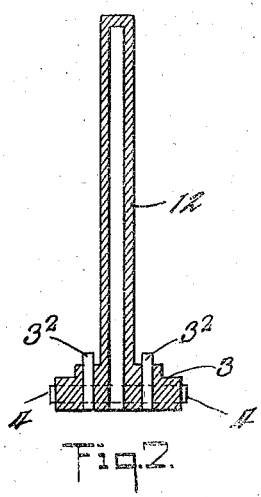
Fig. 7 is an enlarged vertical section of the tube and collar shown in Fig. 6.
Figure 8:
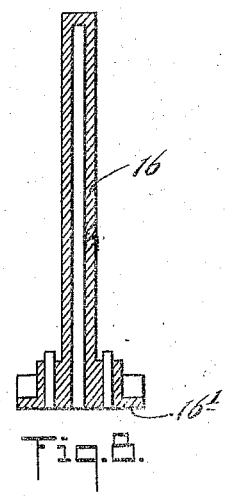
Fig. 8 is a vertical section of another form of tube.
Figure 10:
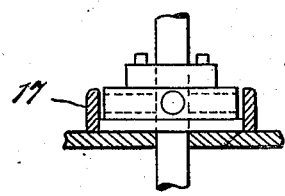
Fig. 10 is an elevation partly in the section showing how a ring may be used instead of a cup in one embodiment of the invention.
Figure 9:
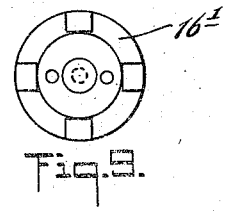
Fig. 9 is a plan view of Fig. 8.
Figure 11:
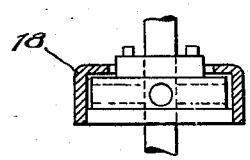
Fig. 11 shows a variation of the form of ring illustrated in Fig. 10.

In a second illustration of our invention (Figs. 6 and 7) as applied to a worsted spinning frame in which the bobbin is carried on a revolving tube mounted on a dead spindle on the lifting rail, we employ a lifting rail 7 traversed in a usual manner. On the lifting rail 7 we mount a dead spindle 11 and on the top $11^1$ of the dead spindle 11 we place a tube 12. The tube has formed on it at its lower end a collar or disc 3 and resting on same is the spinning bobbin 2, which by means of a slot engaging with pins $3^2$ on the disc drives the tube 12 and disc. The disc 3 has holes bored from its periphery towards the centre and in these we place centrifugal members 4. On the dead spindle 11 we mount below the tube 12 and disc 3 a cup 5 the upstanding edges which surround but are clear of the disc 3. Against the inside of the cup 5 the centrifugal members 4 press and drag the spinning bobbins 2. In some cases we make the tube 16 (Figs. 8 and 9) with a disc $16^1$ having the spaces for the centrifugal member open upwards. In a further case in the foregoing first and second arrangements instead of a cup around the disc we mount a ring 17 (Fig. 10) which can be lifted to allow of the insertion or removal of the centrifugal members into or from the disc. In still further cases we make the ring as described with a covering edge 18 (Fig. 11) to partially cover the disc.

In giving a third practical example of our invention as applied to a worsted spinning frame we employ (Figs. 12, 13 and 14) a top flyer rail 21, a flyer 22 mounted in same with the legs hanging downwards (the flyer is driven by ordinary means), a lifting rail 7 supported and traversed in a usual manner, a spindle socket 24 with a spindle 25 mounted on the lifting rail 7. The spindle 25 and socket 24 are coaxial with the flyer 22. At the upper end $25^1$ of the spindle 25 a wing 26 is jointed and folded to a horizontal position while working so as to engage with one of the flyer legs which drives the said spindles 25. At the upper end of the spindle socket 24 we form a cup $24^1$ and inside of the cup $24^1$ we place a disc 3 an easy fit for the cup $24^1$ and a working fit on the spindle 25. On the upper side of the disc 3 two pins $3^2$ project and are driven by a spinning bobbin 28 which we mount on the spindle 25. The bobbin 28 has holes to receive the pins $3^2$ by which it drives the disc 3. We form one or more holes $27^2$ in the disc at right angles to the axis of the spindle and in these we put a wood pin or pins 4 with an easy fit. As the spindle 25 drives the bobbin 2 the pin or pins 4 fly outwards against the cup $24^1$ and so retard the bobbin 2 and take up the yarn. The disc 3 being carried on a driven spindle 25 and in cup $24^1$ absolutely central with the spindle 25 a very delicate and regular drag is secured.

In giving a fourth practical example of our invention also as applied to a worsted spinning frame we employ (Figs. 15 and 16) a top rail 21, a flyer 22 mounted on same with legs $32^1$ hanging downwards. The flyer 22 is driven by means of a tape in an ordinary manner. A lifting rail 7 is employed supported and traversed in a usual manner and on it a dead spindle 34 coaxial with the flyer 22. On the dead spindle 34 a tube 35 is mounted and supported on the upper end of same. At the lower end $35^1$ of the tube 35 we form a drag disc 36 having holes $36^1$ bored at right angles to its axis and radiating to the periphery of same. In these holes $36^1$ we place loose wood pins 37. Around the periphery of the drag disc we mount a ring or cup 5 an easy fit for the drag disc 3. The bobbin by means of pins $36^1$ in the drag disc 3 drives same and by centrifugal force the wood pins 4 press outwards against the inside of the ring or cup 5 referred to, thereby imparting drag to the spinning bobbin 2 to make it take up the thread.

Whether a tube is employed or not, the bobbin is in each case mounted on the spindle for free rotation thereon.

We claim:

1. In flyer spinning frames and the like, a spindle a bobbin mounted upon said spindle for free rotation thereon, and a holder attached to said bobbin and rotating therewith, in combination with centrifugal members carried by said holder adapted to give a drag to said bobbin, the whole being adapted to permit the removal of said centrifugal members without removing the holder from working position.

2. In flyer spinning and like frames according to claim 1, seats for the centrifugal members in the holder, said seats being open upwards for removal of the centrifugal members, substantially as described.

3. In flyer spinning and like frames according to claim 1, an outer ring adapted to receive the press of the centrifugal members said ring being removable to permit the removal of the centrifugal members.

4. In flyer spinning and like frames according to claim 1, a removable outer ring adapted to receive the press of the centrifugal members and a covering edge upon said outer ring substantially as described.

5. In flyer spinning and like frames, a spindle, a bobbin mounted upon said spindle for free rotation thereon, and a disc attached to said bobbin and rotating therewith, in combination with centrifugal members adapted to give a drag to said bobbin, and a removable cover adapted to protect said disc and said centrifugal members from dust and to keep the members in position.

6. In flyer spinning and like frames, a dead spindle a tube mounted for free rotation upon said dead spindle a disc attached to said tube, and a bobbin mounted upon said tube and attached to said disc, in combination with centrifugal members carried by said disc adapted to drag said bobbin.

7. In flyer spinning and like frames a dead spindle, a tube mounted for free rotation upon said dead spindle, a disc attached to said tube, and a bobbin mounted upon said tube and attached to said disc, in combination with centrifugal members carried by said disc adapted to drag said bobbin, and a lifter rail upon which said dead spindle is mounted, substantially as described.

8. In flyer spinning and like frames, a lifting rail, a spindle carried by said lifting rail and driven at the same speed as the flyer, a bobbin supported for free rotation upon said spindle traversed in relation to the flyer by the action of the lifting rail, and a cup immovably mounted beneath said bobbin coaxially with said spindle upon said lifting rail, in combination with a drag disc within said cup driven by said bobbin, and centrifugal member carried by said disc adapted to drag said bobbin substantially as described.

In testimony whereof we have signed our names to this specification.

THOMAS ALEXANDER BOYD.
HAROLD ARTHUR BOYD.